United States Patent
Du et al.

(10) Patent No.: US 6,714,611 B1
(45) Date of Patent: Mar. 30, 2004

(54) WIRELESS NETWORK WITH USER CLOCK SYNCHRONIZATION

(75) Inventors: Yonggang Du, Aachen (DE); Matthew P. J. Baker, Rough Common, Canterbury (GB); Edward S. Eilley, Reigate (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/527,278

(22) Filed: Mar. 17, 2000

(30) Foreign Application Priority Data

Mar. 19, 1999 (DE) .......................................... 199 12 556

(51) Int. Cl.$^7$ ................................................ H04L 7/02
(52) U.S. Cl. ...................................... 375/356; 713/400
(58) Field of Search .................. 375/356, 371, 375/354; 370/509; 713/400

(56) References Cited

U.S. PATENT DOCUMENTS 6,148,049 A * 11/2000 Hein ........................... 375/354
6,278,710 B1 * 8/2001 Eidson ........................ 370/394
6,308,280 B1 * 10/2001 Joseph et al. ............... 713/400

* cited by examiner

Primary Examiner—Stephen Chin
Assistant Examiner—Kevin Kim (57) ABSTRACT

The invention relates to a wireless network which includes a plurality of network nodes, each of which includes a radio device with a respective radio clock supply and is arranged to exchange data via a wireless medium, and also includes a user interface for the exchange of data between the associated radio device and at least one user. At least one user of a network node receives a user clock, being independent of the radio clock, from a user clock supply of the relevant network node. Each network node is arranged to determine, in response to events specified by a central network node, a time value related to the relevant application clock. The central network node transmits at least the last time value formed by a selected network node. Each network node forms the difference between the last two time values determined and synchronizes the frequency of its user clock supply in dependence on the comparison of the difference between its last two time values determined with the difference between the last two time values of the selected network node.

13 Claims, 3 Drawing Sheets

WIRELESS NETWORK WITH USER CLOCK SYNCHRONIZATION

FIELD OF INVENTION

The invention relates to a wireless network with a plurality of network nodes, each of which includes a radio device with a respective radio clock supply and is arranged to exchange data via a wireless medium, and also includes a user interface for the exchange of data between the associated radio device and at least one user.

BACKGROUND OF INVENTION

A wireless network of this kind is known from the document "Technologie drahtloser Netze" by Elmar Török, Funkschau No. 22, 1998, pp. 20 to 25, which describes the configuration of a wireless network with a plurality of network nodes. A plurality of electrical apparatus, for example monitors, computers etc., is connected to a radio device in a network node via a user interface. Data is exchanged with other radio devices via the radio device of each network node. The cited document does not deal with clock synchronization of the applications executed in the network nodes.

SUMMARY OF INVENTION

It is the object of the invention to provide a wireless network in which the user clocks of the individual network nodes are synchronized to one another.

This object is achieved by means of a wireless network of the kind set forth in that at least one user of a network node receives a user clock from a user clock supply of the relevant network node, which user clock is independent of the radio clock, that each network node is arranged to determine, in response to events specified by a central network node, a time value related to the relevant user clock, that the central network node is arranged at least to transmit the last time value formed by a selected network node, and that each network node is arranged to form the difference between the last two time values determined and to realize frequency synchronization of its user clock supply in dependence on the comparison of the difference between its last two time values determined with the difference between the last two time values of the selected network node.

A wireless transmission is to be understood to mean herein a radio, infrared, ultrasound etc. transmission. In the wireless network synchronization of a user clock supply in a network node is realized via radio. The radio synchronization is independent of the synchronization of a user clock supply. In order to achieve this, a central network node initiates events which ensure that in a network node a time value is read from a user time counter which receives a user clock. In addition to the initiation of an event under the control of the central network node, a selected network node (referred to as the user master network node) distributes the last time value formed or the difference between the last two time values formed from the central network node. Subsequently, in a network node the difference is formed between the last two time values read out and the local difference result is compared with the difference result which is received from the central network node and originates from the user master network node. Because the difference results do not relate to the radio clock, the effect of the radio clock variations of the network node on the time and frequency synchronization of the user clock supply is eliminated.

Claim 1 relates to the formation of the difference in a network node while utilizing a user time counter. The selected network node should normally be a network node other than the central network node. In that case the user master network node (selected network node) supplies time data containing the difference result of the user master network node as disclosed in Claim 2.

The Claims 3 and 4 provide the correction value for a user clock supply which includes, for example a PLL (Phase Locked Loop) circuit. A mean value can then be formed so as to reduce disturbances in the transmission of the time data.

Claim 5 describes steps for synchronizing the user clock supply of a network node (hidden network node) by means of an intermediate network node when this network node cannot be reached by the central network node. The hidden network node determines a time value related to the user clock in response to the occurrence of a special event. The special event is transmitted by the intermediate node, for example via a radio synchronization signal. The Claims 6 and 7 disclose the correction value for a user clock supply of a hidden network node.

Claim 8 deals with steps to be taken when there are two sub-networks, each of which includes a central network node while and one sub-network includes the user master network node. The two sub-networks are interconnected via a bridge network node associated with both sub-networks. The network node of the second sub-network determines, upon occurrence of a predetermined event, a time value which is related to the user clock. The event is transmitted, for example, by way of a radio synchronization signal, by the central network node of the second sub-network. The Claims 9 and 11 disclose the correction value for a user clock supply of a network node of the second sub-network.

The Claims 11, 12 and 13 relate to the formation of the absolute time for the user clock in a network node of a single or first sub-network, in a hidden network node, and in a network node of a second sub-network.

BRIEF DESCRIPTION OF DRAWINGS

Embodiments of the invention will be described in detail hereinafter with reference to the Figures. Therein.

DETAILED DESCRIPTION OF THE INVENTION

Figure 1:
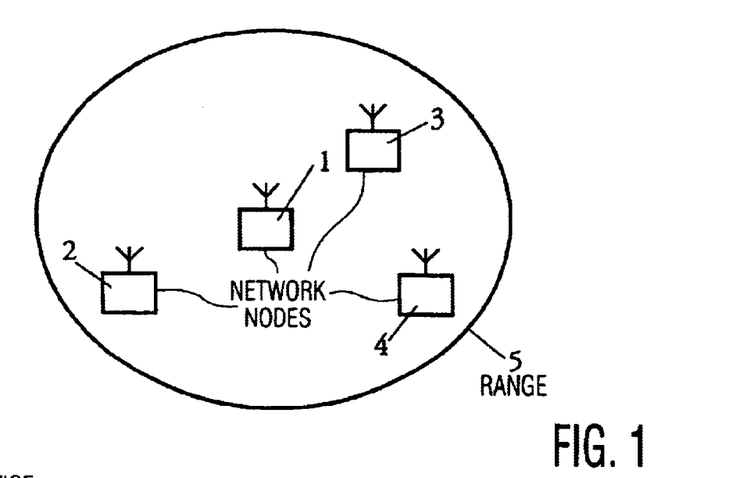
FIG. 1 shows a wireless network with a plurality of network nodes.

FIG. 1 shows a wireless network with a plurality of network nodes 1 to 4. Via radio links the network nodes 1 to 4 exchange data by means of a radio device. The network node 1, serving as a base station in a wireless network, is referred to as the central network node and controls the radio synchronization in the wireless network. The network nodes 2 to 4 are referred to as normal network nodes. The range in which the central network node 1 can exchange data with the other network nodes 2 to 4 is denoted by an ellipse 5 in FIG. 1.

A network node 1 to 4 includes a radio device which establishes respective radio links with other network nodes, and also includes an internal or external user interface, via which the user data is supplied and read out, respectively. In the case of an internal user interface, the user data is generated by electrical circuit elements in the network node. Such an electrical circuit element is, for example, a video codec which is included in the network node and, acting as a user, exchanges data with the radio device via the internal user interface. In the case of an external user interface, the user data is supplied by and to other electrical apparatus via this user interface. A user may be, for example, an electrical circuit element, an electrical apparatus, a program package to be executed by one or more electrical circuit elements and/or one or more electrical apparatus, etc. A user is situated outside the radio device and utilizes the radio device so as to exchange user data with other users.

Figure 2:
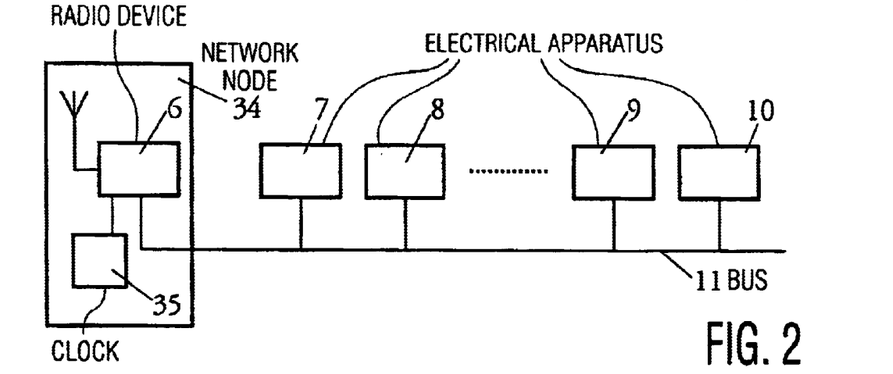
FIG. 2 shows a block diagram of a network node with an external interface and a bus system connected to the external interface.

FIG. 2 shows an example of an external user interface in the form of a bus system 11 via which a plurality of electrical apparatus 7 to 10 exchange useful data, control data and bus synchronization data with a radio device 6 of a network node 34. Such an electrical apparatus 7 to 10 may be a video recorder, a monitor, a tuner, a CD player, etc.

In order to support real-time applications efficiently, the network nodes 1 to 4 include a respective local user clock supply 35 (see FIG. 2). Such a local user clock supply 35 is required for the entire time and frequency synchronization of the electrical circuit components and apparatuses 7 to 10 and hence serves to supply the users in the various network nodes 1 to 4 with a clock which will be referred to as user clock hereinafter.

A radio device 6 also includes a radio clock supply (not shown) for generating a radio clock which is independent of the user clock. A radio clock supply of a network node in a wireless network is customarily synchronized to the radio clock of the central network node 1. The synchronization of a radio clock supply will not be elaborated upon hereinafter. It is assumed that frequency synchronization of the radio clock supply has taken place.

A local user clock supply in a network node is to be synchronized to a local user clock supply of a given network node which is referred to as a user network node. For example, the network node 2 is such a user network node whose user clock is also referred to as the master user clock. The central network node usually does not act as a user master network node, i.e. the user master network node and the central network node are two different network nodes. This separation makes sense because the central network node is responsible mainly for the radio synchronization and not for the synchronization of a local user clock supply generating the relevant user clock. However, it cannot be precluded that in given cases the central network node also constitutes the user master network node. The synchronization of the local user clock supplies in the network nodes 1, 3 and 4 to the master user clock, generated in the network node 2, by means of radio synchronization signals transmitted by the central network node 1 will be described in detail hereinafter. Such a radio synchronization signal may consist, for example, of a series of several bits. No fixed temporal relation need exist between the starting time of a radio synchronization signal and the user clock supply of the user master network node 2, because the master user clock itself need not be transmitted. For example, a series of radio synchronization signals may occur at irregular instants. However, the distance in time between two successive radio synchronization signals may not exceed a maximum value, because otherwise the deviations of the relevant user clocks generated by the local user clock supplies could become too large. Furthermore, it is achieved that the user master network node 2 itself need not generate radio synchronization signals. The user master network node 2 generally transmits, asynchronously with respect to the radio synchronization signals, time data representing information concerning the master user clock. This time data is initially received as normal useful data by the central network node 1 and is subsequently distributed to all network nodes 2 to 4. The distribution of the time data of the user master network node 2 is performed by the central network node 1, because generally it can be assumed that the user master network node 2 cannot directly reach all other network nodes 3 and 4, but only the central network node 1.

Temporally accurate synchronization of a local user clock supply of a network node 1, 3 and 4 to the local user clock supply of the user master network node 2, however, can take place only subject to the condition that time values generated by circuit elements, to be described hereinafter (for example, by a counter), of the network nodes 1 to 4 can be generated at the same instants. It is only in such a case that the comparison of the time values of the user master network node 2 with the time values of the central network node 1 and the normal network nodes 3 or 4 leads to results that can be evaluated. In a network node 1 to 4 the radio synchronization signals are evaluated, for example by means of a filter (for example, matched filters). Such a matched filter supplies a radio synchronization pulse whose maximum value is used to determine the time values related to the relevant local user clock.

For the method to be described hereinafter for the frequency synchronization of the local user clock supplies it is only necessary that all network nodes 2 to 4 can receive the radio synchronization signals from the central network node 1 and that the network nodes 1, 3 and 4 can receive the time data, related to the master user clock, from the user master network node 2. Such a user clock supply is adjusted, for example, by means of a PLL circuit (PLL=Phase Locked Loop). The central network node 1 receives this time data directly from the user master network node 2 and the normal network nodes 3 and 4 receive the time data indirectly from the user master network node 2, via the central network node 1. The radio devices 6 in the network nodes 1 to 4 enable the transmission of the radio synchronization signals from the central network node 1 and the transmission, distribution as well as processing of the time data of the user master network node 2.

Figure 3:
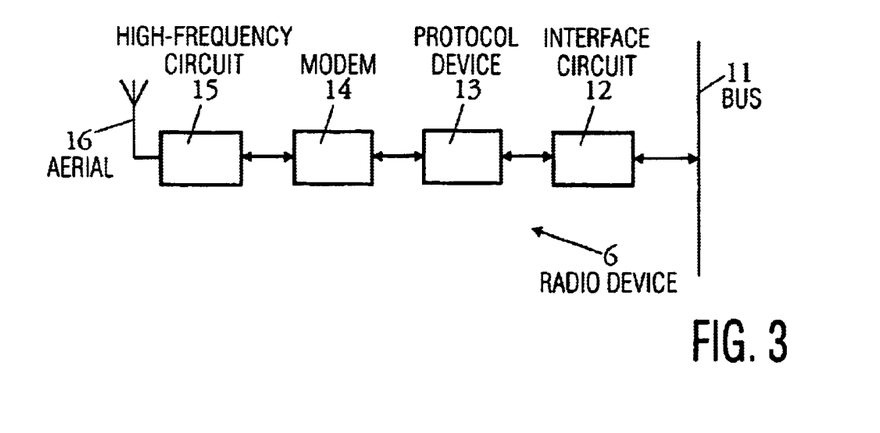
FIG. 3 shows an embodiment of a radio device to be used in the network node shown in FIG. 2.

FIG. 3 shows an embodiment of a radio device 6. An external interface circuit 12 of the radio device 16 is connected to the bus system 11 and receives the user data destined for the radio device 6 from the bus system 11 and applies this data, possibly after format adaptation, to a protocol device 13 of the radio device 6. The interface circuit 12 also applies user data which is delivered by the protocol device 13 to the bus system 11. In addition to the interface circuit 12 and the protocol device 13, the radio device 6 also includes a modem 14, a high-frequency circuit 15 and an aerial 16. The high-frequency circuit 15 transmits data received by the aerial 16, via the modem 14, to the protocol device 13. Furthermore, the aerial 16 transmits data which originates from the protocol device 13 and is transported further by the modem 14 and the high-frequency circuit 15.

The protocol device 13, for example constructed as a processor system, forms packet units from the data delivered by the interface circuit 12, or processable data for the interface circuit 12 from the packet units supplied by the modem 14. A packet unit contains not only the received data but also additional control information which is formed by the protocol device 13. The protocol device 13 uses protocols for the LLC layer (LLC=Logical Link Control) and the MAC layer (MAC=Medium Access Control). The MAC layer controls the multiplex access to the radio transmission medium by a radio device 6, and the LLC layer performs a flow and error check.

In the wireless network shown in FIG. 1 the data can be exchanged between the network nodes 1 and 4 in conformity with a TDMA, FDMA or CDMA method (TDMA=Time Division Multiplex Access, FDMA=Frequency Division Multiplex Access, CDMA=Code Division Multiplex Access). These methods can also be combined. Data is transmitted in given allocated channels. A channel is defined by a frequency range, a time range and, for example, by a spread code in the case of the CDMA method.

The normal network nodes 2 to 4 in the wireless network are controlled by the central network node 1. Therefore, the user master network node 2 belongs to the normal network nodes, because it is not responsible for the radio synchronization of the network. This means that only the central network node controls the radio synchronization, the medium access control (MAC), the establishment of links, etc. in the centrally controlled wireless network. The user master network node 2, however, controls the synchronization for the real-time applications running in a distributed fashion in the wireless network.

Each network node 1 to 4 includes a user time counter which receives clock pulses from the relevant local user clock supply. The user time counter enables the local user clock supply in each network node 1 to 4 to be synchronized to the frequency and possibly the absolute time of the user clock supply of the user master network node 2. To this end, the values of the relevant user time counters of the network nodes 1 to 4, referred to as time values, are read out at given events, known to all network nodes 1 to 4, after which they are compared. Comparison can take place asynchronously, i.e. the comparison need not be performed immediately at a given instant following the event. An event is referred to as the occurrence of a given criterion of a received radio signal.

For the radio transmission of data between the network nodes 1 to 4, the MAC layer also utilizes at least a frame synchronized signal. This frame has different time slots for radio synchronization data, control data and useful data and is referred to as a MAC frame. During a predetermined period of the MAC frame (for example, at the beginning of each MAC frame) the central network node 1 transmits radio synchronization signals which can be unambiguously detected by the other network nodes 2 to 4. The radio synchronization signal is transmitted by the central network node 1, for example, every q MAC frames (q≧1, qϵN). The successive MAC frames may have a fixed length or each time a different length. In the latter case, however, the length of a MAC frame may not exceed a given maximum value which is dependent on the allowable maximum deviation of the local user clock supplies that is imposed by the quality factor of the PLL circuit. Moreover, the value q should be selected so that the synchronization of the user clock supplies to the master user clock is ensured.

For the frequency synchronization of the local user clock supplies each network node 1 to 4 is provided with two registers for the storage of time values. A first register stores a first time value $R1(N_i)$ which corresponds to the receiving instant, related to the user clock, of the last radio synchronization signal but one, and the second register stores a time value $R2(N_i)$ which corresponds to the receiving instant, related to the user clock, of the last radio synchronization signal. It must be ensured that the first time value $R1(N_i)$ and the second time value $R2(N_i)$ are read out from the user time counter a constant delay time τ after the occurrence of the maximum value of the radio synchronization pulse formed from the radio synchronization signal. It is thus achieved that $R1(N_i)$ and $R2(N_i)$ are read out from the relevant registers by all network nodes 1 to 4 at instants which have been shifted by a constant delay time. As is stated above, the maximum value is detected, for example, by a detection circuit which succeeds the matched filter. $N_i$ indicates the network node i (i=1, 2, . . . ) which performs the storage of the instants in the registers. The difference $R2(N_i)-R1(N_i)$, where i=2 to 4, which is formed in a normal network node 2 to 4 then represents the difference between the receiving instants, related to the user clock, of the last two radio synchronization signals received from the central network node 1. The central network node 1 also forms the difference $\delta_1 = R2(N_i)-R1(N_i)$ a given period of time after the start of the radio synchronization signal corresponding to the receiving instant of the radio synchronization signal in the normal network node. As a result of the differentiation, the constant delay time τ has no effect on the synchronization operation. When a local user clock supply, and hence a user time counter with the user clock supply of a network node $N_i$ (i=1, . . . , 4), has been synchronized to the user time counter of the user master network node 2, the difference $R2(N_2)-R1(N_2)$ formed in the user master network node 2 does not deviate from the difference $R2(N_i)-R1(N_i)$, where i=1, 3 and 4, formed in a normal network node 1, 3 and 4.

The local user clock supplies in the wireless network are synchronized as follows. A network node 2, 3 and 4 stores, after the reception of a radio synchronization signal from the central network node, the instant of reception of the radio synchronization signal, related to the user clock, in its respective second register as the instant $R2(N_i)$. This instant is written into the second register as the count from the relevant user time counter. The contents or instant of the second register $R2(N_i)$ has been shifted into the first register beforehand and is referred to as the instant $R1(N_i)$. The network node 1 can also calculate the instant $R2(N_1)$, related to its user clock, because it knows the distance in time between the start of a radio synchronization signal and the maximum value of this radio synchronization pulse formed from the radio synchronization signal by means of the matched filter.

Figure 4:
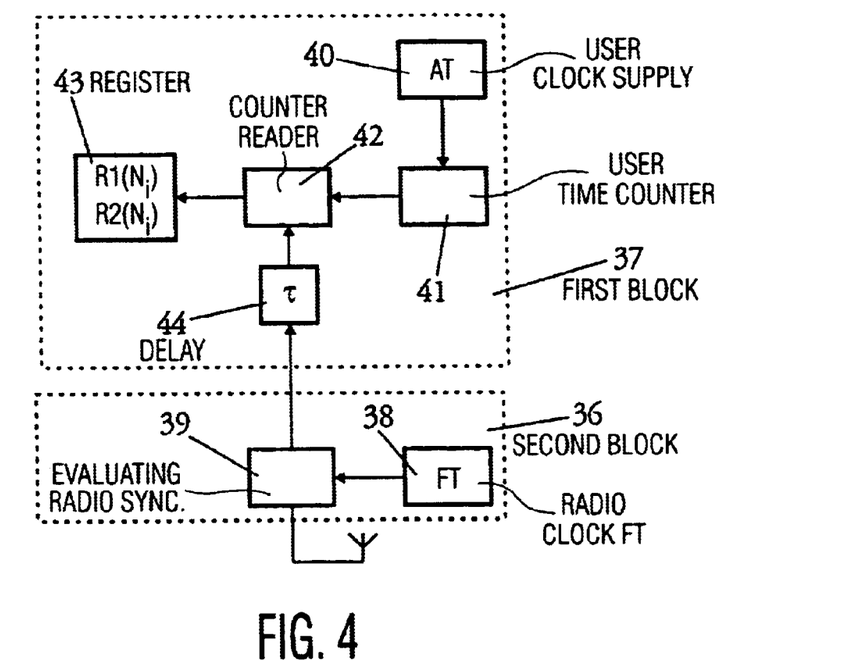
FIG. 4 shows two function blocks illustrating the function of the radio device and the synchronization of the user clock supply.

These operations can be illustrated on the basis of the functional diagram of FIG. 4 which shows two blocks 36 and 37. The first block 36 relates to a radio device 6 in a network node 1 to 4 and the second block 37 relates to the evaluation of the counts of a user time counter. The block 36 contains two blocks 38 and 39. The block 38, indicating the function of the radio clock supply, supplies the radio clock FT and the block 39 evaluates the radio synchronization signal received via the radio link. The instant of reception of the radio synchronization signal is applied to the block 37 as the maximum value of the radio synchronization pulse formed from the radio synchronization signal. The block 37 contains five further blocks 40 to 44. The block 40 represents the user clock supply and applies a user clock to the block 41. The block 41 is a user time counter which increments its count in response to each user clock. The block 42 reads a count from the user time counter (block 41) when the block 39 supplies an enable pulse which is initiated by the arrival of a radio synchronization signal. The enable pulse is formed by a detection circuit whenever the maximum value of the radio synchronization pulse formed by the matched filter is reached. The count read out is written into the second register as the count $R2(N_i)$ by the block 42. The block has first written the old count into the first register as the count $R1(N_i)$. The processing of the different signals in the blocks 36 and 37 produces a network node-specific delay $\tau$ between the instant of reading out of the user counter and the receiving instant of the maximum value of the radio synchronization pulse. This time delay is symbolized by the block 44 which is arranged between the blocks 39 and 42.

After the reception of a radio synchronization signal from the central network node 1, the difference $\delta = R2(N_2) - R1(N_2)$ is formed in the user master network node 2, and the difference result is applied, via a single radio link, as time data to the central network node 1. The distance in time between the start of the radio synchronization pulse resulting from the radio synchronization signal and the maximum value of the radio synchronization pulse is taken into account, because the central network node 1 usually cannot transmit and receive at the same time. A given time slot of the MAC frame can be used for the transmission of the difference result $\delta_2$. The central network node 1 compares the difference value $\delta_2$ with its own difference result $\delta_1 = R2(N_1) - R1(N_1)$. If $\delta_2 > \delta_1$, the central network node 1 should increment the clock of its local user clock supply by the value $(\delta_2 - \delta_1)/\delta_2$. The clock of the user clock supply of the central network node 1 is reduced by the value $(\delta_1 - \delta_2)/\delta_2$ when the central network node 1 detects that $\delta_2 < \delta_1$. The user clock of a local user clock supply need not be changed when the difference values $\delta_2$ and $\delta_1$ are equal.

The central network node 1 transmits the difference value $\delta_2$ as time data during the MAC frame in order to synchronize a local user clock supply of a normal network node 3 or 4. For example, the time data is transmitted during a given time slot of the MAC frame, via radio distribution links, i.e. such time data is destined for each normal network node 2 to 4. Each normal network node 3 and 4, except for the user master network node, compares, after reception of the difference value $\delta_2$ and after formation of the difference between the instants $R1(N_i)$ and $R2(N_i)$, where i=3 or 4, stored in the respective own registers, the received difference value $\delta_2$ with the calculated difference value $\delta_3$ or $\delta_4$. When $\delta_2 > \delta_3$ or $\delta_2 > \delta_4$, a normal network node 3 or 4 increases the local clock of its user clock supply by the value $(\delta_2 - \delta_i)/\delta_2$, where i=3 or 4. In the other case, when $\delta < \delta_i$, a normal network node 3 or 4 decreases the local user clock by the value $(\delta_i - \delta_2)/\delta_2$, where i=3 or 4. When the difference values $\delta_2$ and $\delta_3$ or $\delta_4$ are equal, the local user clock of a normal network node 3 or 4 has exactly the frequency of the local user clock supply of the user master network node 2.

Figure 5:
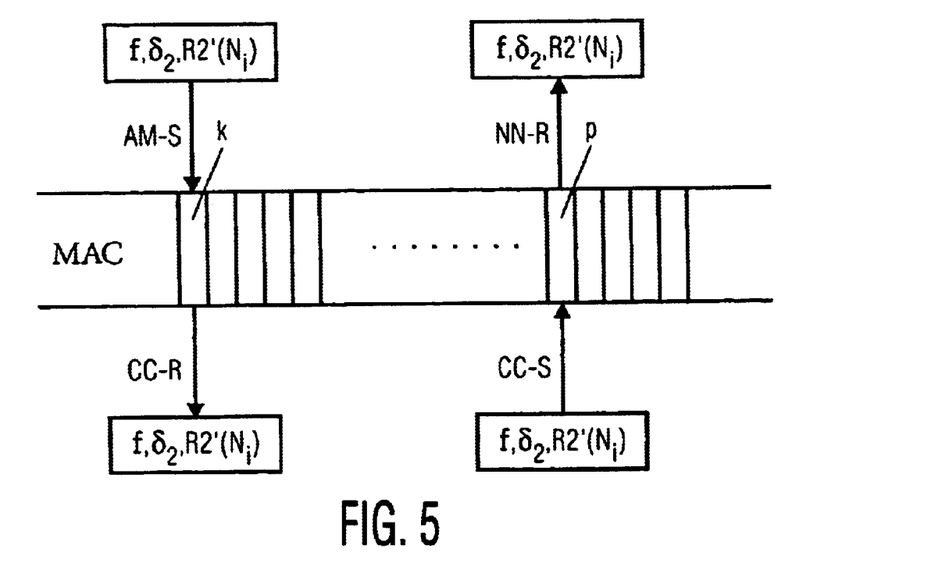
FIG. 5 shows a MAC frame illustrating the transmission chart for time data.

The described transmission of the time data in the local network can be further illustrated by means of FIG. 5 which shows a MAC frame. During a first time slot k (k∈N) of the MAC frame the user master network node 2 transmits as time data the difference value $\delta_2$, formed in the user master network node 2, a frame identification f which characterizes the MAC frame, and possibly also the time value $R2'(N_2) = R2(N_2) - \tau$, last read from the user time counter of the user master network node 2 and corrected by the delay time $\tau$, to the central network node 1. The corrected time value $R2'(N_2)$ is required for the calculation of the absolute time in the wireless network as will be described hereinafter. In FIG. 5 the transmission mode of the user master network node 2 is denoted by the reference AM-S and the receiving mode of the central network node by the reference CC-R. The time data received by the central network node 1 is distributed between the other normal network nodes 3 and 4 during a subsequent slot p (p>k, p∈N) of the MAC frame. This transmission mode of the central network node 1 during the MAC frame m is referred to as CC-S and the receiving mode of the normal network nodes 3 and 4 is denoted by the reference NN-R.

Because of the formation of the difference in the network nodes 1 to 4, neither the constant delay time $\tau$ nor the distance between the networks 1 to 4 (propagation delay) will have an effect on the synchronization. It is not necessary for the radio synchronization signal to be transmitted at the beginning of a MAC frame. Furthermore, it is not necessary either for the central network node to generate the radio synchronization signal for each MAC frame.

The user time counter and the first and the second register may be discrete components and form part, for example of an own circuit which also includes a further circuit element for differentiation and comparison with other difference values. However, it is advantageous to use existing circuit elements. The interface circuit 12 in each radio device 6, which may be constructed, for example, as a processor system, is capable of performing the functions of the user time counter, the first and the second register, and the calculation functions. After the calculation of the difference value, the interface circuit 12 then possibly applies a frequency correction value to the associated user clock supply. The matched filter and the detection circuit may form part, for example, of the modem 14. In relation to FIG. 4 the function of the user time counter, of the first and the second register, and the calculation function form part of the block 37. The functions of the matched filter and the detection circuit form part of the block 36.

The synchronization of the local user clock supplies can also be realized by forming the mean value of several time values in order to reduce the effects of fluctuations during the transmission of the time data. The following formule should then be calculated in a network node 1 to 4:

$$\frac{\Delta_1 - \Delta_2}{\Delta_2} = \frac{\left[\left(\sum_{j=n-N}^{n-1} \delta_{i,j}\right) + \delta_{i,n}\right] - \left[\left(\sum_{j=n-N}^{n-1} \delta_{2,j}\right) + \delta_{2,n}\right]}{\left(\sum_{j=n-N}^{n-1} \delta_{2,j}\right) + \delta_{2,n}}$$

Therein, $\Delta_i$ is the sum of the difference values of a network node i, where i=1, 3 or 4, $\Delta_2$ is the sum of the difference values of the user master network node 2, $\delta_{ij}$ is a difference value of a network node i at the instant j, and $\delta_{2j}$ is a difference value of the user master network node at the instant j. N indicates the number of difference values taken into account for forming the mean value (for example, N=500). The index n is the index for the last difference value $\delta_{i,n}$ or $\delta_{2,n}$ formed. Such formation of the mean value renders the synchronization insusceptible to interference during the transmission of the time data and also to a jitter effect during the reading out from the relevant user time counter. For example, for the purpose of such formation of the mean value additional registers or memories may be included in the interface circuit 12 in each radio device 6.

Instead of transmitting a difference value $\delta_2$ as time data, it is also possible to transmit only the time value $R2(N_2)$ of the user master network node. The central network node 1 and the normal network nodes 3 and 4 then calculate, instead of the user master network node 2, the difference value $\delta_2$ from the last two time values $R2(N_2)$ received. For example, additional registers may be provided in the interface circuit 12 in each radio device 6 in order to form this difference.

Figure 6:
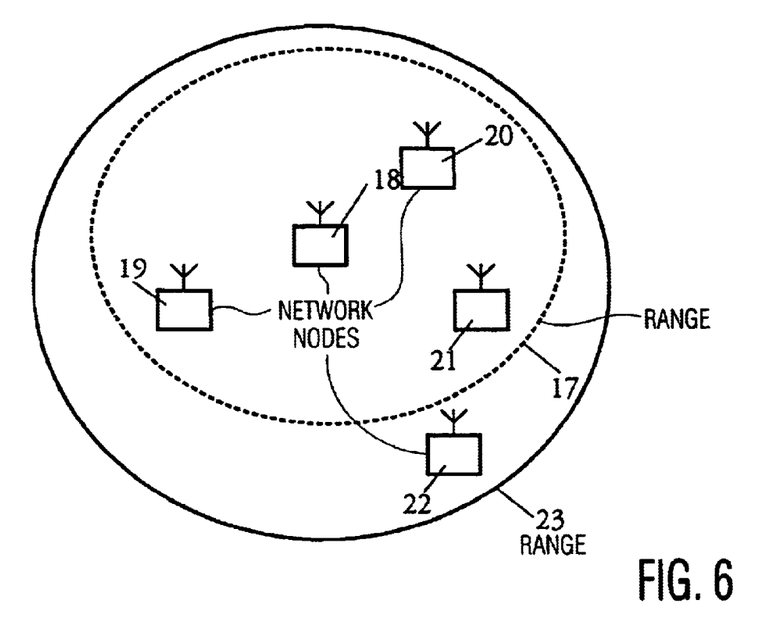
FIG. 6 shows a wireless network with a hidden network node.

The synchronization of a user clock supply of a normal network node can also be executed when the normal network node cannot receive data directly from the central network node. This situation is illustrated in FIG. 6. The network nodes 18 to 21 which are situated within the dashed ellipse 17 are capable of exchanging data via radio links. The network node 18 in FIG. 6 is the central network node, the network node 19 is the user master network node (and at the same time also a normal network node) and the network nodes 20 and 21 are normal network nodes. Outside the ellipse 17 there is situated a further normal network node 22 which cannot receive data from the central network node 18. The overall wireless network is represented by an ellipse 23 in the form of a solid line in FIG. 6.

The normal network node 22 is also referred to as a hidden network node, because it cannot receive data from the central network node 18; however, it can receive data from the normal network node 21 via a radio link. The normal network node 21 is also referred to as an intermediate network node, because it is capable of transmitting data from the central network node 18 to the hidden network node 22.

The synchronization of the local user clock supply of the hidden network node 22 to the user clock of the user master network node 19 is performed as follows. When the user clock of the intermediate network node 21 has been synchronized to the master user clock of the user master network node 19 in conformity with the described diagram, the intermediate network node generates radio synchronization signals (special radio synchronization signals) which are similar to those generated by the central network node 1. Such a special radio synchronization signal may also consist of a series of several bits which are transmitted during a predetermined time slot of the MAC frame. This special synchronization signal is transmitted by the intermediate network node 21, for example, every q MAC frames ($q \geq 1$, $q \in N$). The value q should be chosen so that the synchronization of the user clock supply of the hidden network node 22 to the master user clock by a PLL circuit is ensured.

When the hidden network node 22 has received a special radio synchronization signal from the intermediate network node 21, it shifts the time value $R1(N_{22})$, stored in the second shift register and related to the user clock, into the first register and stores the time value $R2(N_{22})$ of the arrival of the special radio synchronization signal (maximum value of the special radio synchronization pulse formed from the special radio synchronization signal), delivered by the user time counter, into the second register. Subsequently, the hidden network node 22 calculates the difference $\delta_{22}=R2(N_{22})-R1(N_{22})$. After the transmission of the special radio synchronization signal, the intermediate network node 21 calculates the difference $\delta_{21}=R2(N_{21})-R1(N_{21})$. The distance in time between the start of a special radio synchronization signal and the maximum value of the special radio synchronization pulse resulting from the special radio synchronization signal is then taken into account, because the intermediate network node 21 usually cannot receive and transmit at the same time. The intermediate network node 21 transmits the time data $\delta_{21}$ at an instant later than the radio synchronization signal. This instant may lie, for example between the transmission instants of two special radio synchronization signals. After the reception of the time data $\delta_{21}$, the hidden network node 22 compares the difference values $\delta_{21}$ and $\delta_{22}$. When $\delta_{21}>\delta_{22}$, the local user clock supply of the hidden network node 22 must be increased by the value $(\delta_{21}-\delta_{22})/\delta_{21}$. When $\delta_{21}<\delta_{22}$, the local user clock supply must be reduced by the value $(\delta_{22}-\delta_{21})/\delta_{21}$. When the two difference values $\delta_{21}$ and $\delta\Delta_{22}$ are equal, the local user clock supply of the hidden network node 22 is synchronized to the user clock of the intermediate network node 21 and, therefore, indirectly to the master user clock of the user master network node 19.

A mean value can also be formed for a hidden network node by using the following formule:

$$\frac{\Delta_{22}-\Delta_{21}}{\Delta_{21}} = \frac{\left[\left(\sum_{j=n-N}^{n-1}\delta_{22,j}\right)+\delta_{22,n}\right]-\left[\left(\sum_{j=n-N}^{n-1}\delta_{21,j}\right)+\delta_{21,n}\right]}{\left(\sum_{j=n-N}^{n-1}\delta_{21,j}\right)+\delta_{21,n}}$$

Therein, $\Delta_{21}$ is the sum of the difference values of the network node 21, $\Delta_{22}$ is the sum of the difference values of the network node 22, $\delta_{21,j}$ is a difference value of the network node 21 at the instant j, and $\delta_{22,j}$ is a difference value of the network node 22 at the instant j. N indicates the number of difference values taken into account for the formation of the mean value.

Figure 7:
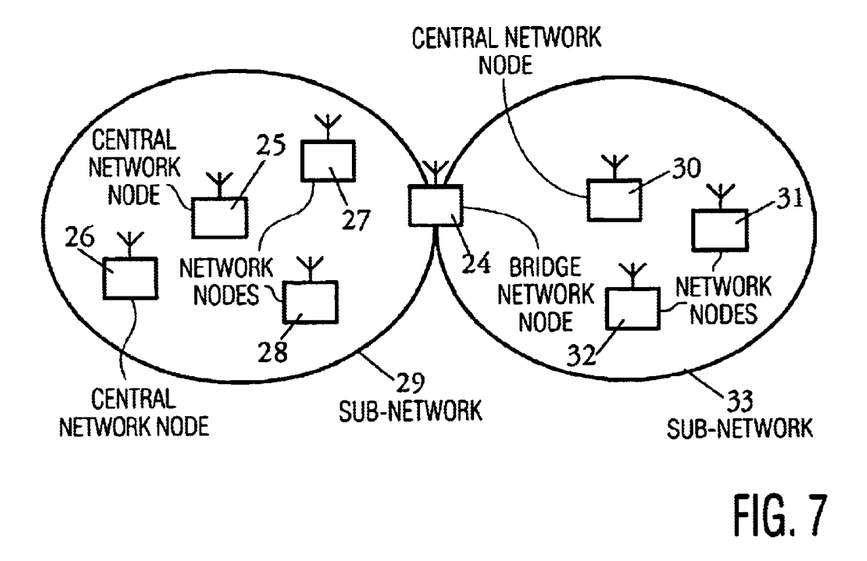
FIG. 7 shows a wireless network with two sub-networks.

When the wireless network includes a plurality of sub-networks, the network nodes of the sub-network which does not include the user master network node can be synchronized to the master user clock by means of a bridge network node which is capable of exchanging data, via radio links, with the network nodes of the sub-networks. FIG. 7 shows a wireless network with two sub-networks which are interconnected via a bridge network node 24. In addition to the bridge network node 24, the first sub-network includes the central network node 25, the user master network node 26 and the normal network nodes 27 and 28. The range in which the central network node 25 can exchange data with the other network nodes 24, 26, 27 and 28 is denoted by an ellipse 29 in FIG. 7. The second sub-network in FIG. 7 includes, in addition to the bridge network node 24, a central network node 30 and two normal network nodes 31 and 32. The ellipse 33 in FIG. 7 indicates the range in which the central network node 30 can exchange data with other network nodes.

The bridge network node 24, being registered at the central network nodes 25 and 30 of the two sub-networks, includes a radio device with either one or two radio branches. Such a radio branch consists of the circuit elements shown in FIG. 3. In case the radio device of the bridge network node includes two radio branches, a permanent connection exists with the two sub-networks 29 and 33. In the case involving only a single branch of the radio device of the bridge network node 24, a connection exists either with the first or with the second sub-network. The time during which the bridge network node 24 is connected to the sub-networks may be either the same or different. The use of a radio device having only one radio branch in the bridge network node 24 offers the advantage that fewer circuit means are required.

It is assumed that the user clock supply of the bridge network node has already been synchronized to the master user clock as described above. For the second sub-network with the central network node 30 the bridge network node 24 then imitates the network node which supplies the master user clock. First the user clock supply of the central network node 30 is synchronized to the user clock of the bridge network node 24 as described above. To this end, the bridge network node 24 utilizes the radio synchronization signal of the central network node 30 as an event for forming the difference $\delta_{24}=R2(N_{24})-R1(N_{24})$ and transmits the difference result $\delta_{24}=R2(N_{24})-R1(N_{24})$ as further time data to the central network node 30, while it is connected to the central network node 30, during a MAC frame. The central network node 30 then distributes this further time data to all other network nodes 31 and 32 in the sub-network 33. In this respect it is assumed that all other network nodes 30 to 32 in the sub-network 33 read the time value $R1(N_i)$ or $R2(N_i)$ from the relevant user time counter in response to the occurrence of the same event as in the bridge network node, and form the difference $\delta_i=R2(N_i)-R1(N_i)$, where i=30, 31 and 32. The distance in time between the start of a radio synchronization signal and the maximum value of the radio synchronization pulse resulting from the radio synchronization signal is then taken into account in the central network node 30, because the central network node 30 usually cannot transmit and receive at the same time. The described comparison of the difference of the time values of the network nodes 30 to 32 with the difference of the time values of the bridge network node 24 enables synchronization of the user clock of each network node 30 to 32 in the sub-network 33.

In the case of one radio branch in the radio device of the bridge network node, the time of connection to a sub-network should not exceed a given value as otherwise suitably accurate synchronization will not be ensured for the other sub-network. For example, it is advantageous to use a uniform connection time for the relevant sub-networks which amounts to each time two MAC frames.

The described method for time and frequency synchronization of the user clock supplies in a sub-network which does not contain the user master network node for the case involving two sub-networks can also be extended for further sub-networks included in the wireless network. These sub-networks, each of which is controlled by a central network node, receive the necessary data from another sub-network via a bridge network node. The further sub-networks can thus successively receive the time data of the user master network node in conformity with the above diagram.

A mean value can also be formed for the network nodes 30 to 32 of the second sub-network. For each network node i (i=30, 31, 32) of the second sub-network the following formule holds:

$$\frac{\Delta_i - \Delta_{24}}{\Delta_{24}} = \frac{\left[\left(\sum_{j=n-N}^{n-1} \delta_{i,j}\right) + \delta_{i,n}\right] - \left[\left(\sum_{j=n-N}^{n-1} \delta_{24,j}\right) + \delta_{24,n}\right]}{\left(\sum_{j=n-N}^{n-1} \delta_{24,j}\right) + \delta_{24,n}}$$

Therein, $\Delta_{24}$ is the sum of the difference values of the bridge network node 24, $\Delta_i$(i=30, 31, 32) is the sum of the difference values of a network node i, $\delta_{24j}$ is a difference value of the bridge network node 24 at the instant j, and $\delta_{ij}$ is a difference value of the network node i at the instant j. N indicates the number of difference values taken into account for forming the mean value.

The method to be described hereinafter enables the synchronization of a network node to the absolute time of the user master network node. Such absolute time is often required, because operations have to be executed at given instants related to the absolute time. For example, in that case the user master network node 2 in a wireless network as shown in FIG. 1 need transmit not only the difference value $\delta_2$ to the central network node 1, via a single link, but the value $R2(N_2)$, stored in the second register, should also be transmitted, after correction with the delay time τ, as the absolute time value $R2'(N_2)=R2(N_2)-\tau$. This value $R2'(N_2)$ is distributed to the normal network nodes 3 and 4 by the central network node 1. After the reception of this absolute time data $R2'(N_2)$, the central network node 1 and the normal network nodes 3 and 4 compare the time value $R2'(N_i)$, where i=1, 3 or 4, stored in their respective second register, with the received instant $R2'(N_2)$ originating from the user master network node 2. If $R2'(N_2) \neq R2'(N_i)$, where i=1, 3 or 4, the value TC of the relevant user time counter must be corrected. This means that the corrected value $TC_{new}$ of a user time counter is calculated, for example by the interface circuit 12, in conformity with the following formule:

$$TC_{new}=TC_{old}+R2'(N_2)-R2'(N_i),$$

where $TC_{old}$ is the current value of the user time counter prior to the correction in the network node i and i=1, 3 or 4. The synchronization in, for example, a normal network node 3 or 4 to the absolute time of the user master network node 2 must be performed after the frequency synchronization of the associated user clock supply to the user clock supply of the user master network node 2.

A hidden network node can be synchronized to the absolute time of the user master network node 2 by means of the frequency and time synchronized intermediate network node (see FIG. 6) and a network node in a second sub-network can be synchronized thereto in the same way by means of a bridge network node (see FIG. 7) after the frequency synchronization of the relevant network node to the absolute time. The following formule then holds:

$$TC_{new}=TC_{old}+R2'(N_r)-R2'(N_i),$$

where $R2'(N_r)$ is the last transmitted time value of the frequency synchronized bridge network node which has been changed by a network node-specific correction value.

In the case of rather large distances between the network nodes, the propagation delay between the network nodes must be taken into account for the calculation of the absolute time. This propagation delay can be determined, for example, by measuring the transit time of test signals between the network nodes.

What is claimed is:

1. A wireless network with a plurality of network nodes, each of which includes a radio device with a respective radio clock supply and is arranged to exchange data via a wireless medium, and also includes a user interface for the exchange of data between the associated radio device and at least one user, wherein at least one user of a network node receives a user clock from a user clock supply of the relevant network node, which user clock is independent of the radio clock, that each network node is arranged to determine, in response to events specified by a central network node, a time value related to the relevant user clock, that the central network node is arranged at least to transmit a last time value formed by a selected network node, and that each network node is arranged to form the difference between the last two time values determined and to realize frequency synchronization of its user clock supply in dependence on the comparison of the difference between its last two time values determined with the difference between last two time values of the selected network node, wherein the central network node is arranged
- to transmit radio synchronization signals at given instants, to shift the time value read out after the transmission of the previous radio synchronization signal from a second to a first register, and
- to read out, at an instant which corresponds to the maximum value of the radio synchronization pulse formed from a radio synchronization signal in another network node, the time value from an associated user time counter and to buffer it subsequently in the second register, and wherein another network node is arranged
- to form a radio synchronization pulse whose maximum value represents the specified event from the radio synchronization signal received,
- to read out, after the occurrence of the maximum value of the radio synchronization pulse, a time value from an associated user time counter,
- to shift the time value read out at the previous radio synchronization signal from a second to a first register, and
- to buffer the last time value read out from the user time counter in the second register.

2. A wireless network with a plurality of network nodes, each of which includes a radio device with a respective radio clock supply and is arranged to exchange data via a wireless medium, and also includes a user interface for the exchange of data between the associated radio device and at least one user, wherein at least one user of a network node receives a user clock from a user clock supply of the relevant network node, which user clock is independent of the radio clock, that each network node is arranged to determine, in response to events specified by a central network node, a time value related to the relevant user clock, that the central network node is arranged at least to transmit a last time value formed by a selected network node, and that each network node is arranged to form the difference between the last two time values determined and to realize frequency synchronization of its user clock supply in dependence on the comparison of the difference between its last two time values determined with the difference between last two time values of the selected network node, wherein the central network node
- does not have the function of the selected network node which is referred to as the user master network node,
- is arranged to transmit time data containing the difference result between the time values last formed in the user master network node, and wherein
- each network node is arranged to perform, after the transmission of the time data, the comparison between the own difference result and the different result of the application master network node.

3. A wireless network as claimed in claim 2, wherein,
a network node is arranged to correct the frequency of its user clock supply by the value $(\delta_i-\delta_r)/\delta_r$ in the case of a deviation between the difference results, where $\delta_i$ is a difference result of a network node i and $\delta_r$ is a difference result of the user master network node r ($i \neq r$).

4. A wireless network as claimed in claim 3, wherein
a network node is arranged to perform a frequency correction of its user clock supply by the value $(\Delta_i-\Delta_r)\Delta_r$ in the case of a deviation between the difference results, where $$\frac{\Delta_i - \Delta_r}{\Delta_r} = \frac{\left[\left(\sum_{j=n-N}^{n-1} \delta_{i,j}\right) + \delta_{i,n}\right] - \left[\left(\sum_{j=n-N}^{n-1} \delta_{r,j}\right) + \delta_{r,n}\right]}{\left(\sum_{j=n-N}^{n-1} \delta_{r,j}\right) + \delta_{r,n}}$$

$\delta_{i,j}$ is a difference result at the instant j of the network node i, $\delta_{r,j}$ is a difference result at the instant j of the user master network node r ($i \neq r$), and N is the number of difference results.

5. A wireless network with a plurality of network nodes, each of which includes a radio device with a respective radio clock supply and is arranged to exchange data via a wireless medium, and also includes a user interface for the exchange of data between the associated radio device and at least one user, wherein at least one user of a network node receives a user clock from a user clock supply of the relevant network node, use which user clock is independent of the radio clock, that each network node is arranged to determine, in response to events specified by a central network node, a time value related to the relevant user clock, that the central network node is arranged at least to transmit a last time value formed by a selected network node, and that each network node is arranged to form the difference between the last two time values determined and to realize frequency synchronization of its user clock supply in dependence on the comparison of the difference between its last two time values determined with the difference between last two time values of the selected network node, wherein
- a network node which is referred to as a hidden network node and does not receive data from the central network node also includes a user clock supply,
- that the hidden network node is arranged to determine, in response to special events which are specified by a frequency synchronized network node which is referred to as an intermediate network node, a time value related to the relevant user clock,
- that the intermediate network node is arranged at least to transmit the last own time value formed in response to the special event, and
- that the hidden network node is arranged to form the difference between the last two time values determined and to perform frequency synchronization of its user clock supply in dependence on the comparison of the difference between its two time values last determined and the difference of the last two time values of the intermediate network node.

6. A wireless network as claimed in claim 5, wherein,
a hidden network node is arranged to correct the frequency of its user clock supply by the value $(\delta_i-\delta_r)/\delta_r$ in the case of a deviation of the difference results, where $\delta_i$ is a difference result of a hidden network node i and $\delta_r$ is the difference result of the frequency synchronized intermediate network node r ($i \neq r$).

7. A wireless network as claimed in claim 6, wherein,
a hidden network node is arranged to perform frequency correction of its user clock supply by the value $(\Delta_i-\Delta_r)/\Delta_r$ in the case of a deviation of the difference results, where $$\frac{\Delta_i - \Delta_r}{\Delta_r} = \frac{\left[\left(\sum_{j=n-N}^{n-1} \delta_{i,j}\right) + \delta_{i,n}\right] - \left[\left(\sum_{j=n-N}^{n-1} \delta_{r,j}\right) + \delta_{r,n}\right]}{\left(\sum_{j=n-N}^{n-1} \delta_{r,j}\right) + \delta_{r,n}}$$

$\delta_{i,j}$ is a difference result at the instant j of the hidden network node i, $\delta_{r,j}$ is a difference result at the instant j of the frequency synchronized intermediate network node r (i≠r), and N is the number of difference results.

8. A wireless network with a plurality of network nodes, each of which includes a radio device with a respective radio clock supply and is arranged to exchange data via a wireless medium, and also includes a user interface for the exchange of data between the associated radio device and at least one user,
wherein at least one user of a network node receives a user clock from a user clock supply of the relevant network node, which user clock is independent of the radio clock, that each network node is arranged to determine, in response to events specified by a central network node, a time value related to the relevant user clock, that the central network node is arranged at least to transmit a last time value formed by a selected network node, and
that each network node is arranged to form the difference between the last two time values determined and to realize frequency synchronization of its user clock supply in dependence on the comparison of the difference between its last two time values determined with the difference between last two time values of the selected network node, wherein
given network nodes which cannot be reached directly by the central network node form, in conjunction with the central network node, a first sub-network while further network nodes form a second sub-network in conjunction with a further central network node,
that a network node which is associated with both networks and is referred to as a bridge network node is arranged to exchange data with both sub-networks,
that the network nodes of the second sub-network also include a respective user clock supply,
that each network node of the second sub-network is arranged to determine, in response to events specified by the further central network node, a time value related to the relevant user clock,
that the further central network node is arranged to transmit at least the last time value of the frequency synchronized bridge network node, formed in response to the event specified by the further central network node, and
that each network node of the second sub-network is arranged to form the difference between the last two time values determined and to perform frequency synchronization of its user clock supply in dependence on the comparison of the difference between its last two time values determined with the difference between the last two time values of the bridge network node.

9. A wireless network as claimed in claim 8, wherein,
a network node of the second sub-network is arranged to correct the frequency of its user clock supply by the value $(\delta_i-\delta_r)/\delta_r$ in the case of a deviation of the difference results, $\delta_i$ being a difference result of a network node i of the second sub-network and $\delta_r$ the difference result of the frequency synchronized bridge network node r (i≠r).

10. A wireless network as claimed in claim 9, wherein,
a network node of the second sub-network is arranged to correct the frequency of its user clock supply by the value $(\delta_i-\delta_r)/\delta_r$ in the case of a deviation of the difference results, where $$\frac{\Delta_i - \Delta_r}{\Delta_r} = \frac{\left[\left(\sum_{j=n-N}^{n-1} \delta_{i,j}\right) + \delta_{i,n}\right] - \left[\left(\sum_{j=n-N}^{n-1} \delta_{r,j}\right) + \delta_{r,n}\right]}{\left(\sum_{j=n-N}^{n-1} \delta_{r,j}\right) + \delta_{r,n}}$$

$\delta_{i,j}$ is a difference result at the instant j of the network node i of the second sub-network, $\delta_{r,j}$ is a difference result at the instant j of the frequency synchronized bridge network node r (i≠r), and N is the number of difference results.

11. A wireless network with a plurality of network nodes, each of which includes a radio device with a respective radio clock supply and is arranged to exchange data via a wireless medium, and also includes a user interface for the exchange of data between the associated radio device and at least one user,
wherein at least one user of a network node receives a user clock from a user clock supply of the relevant network node, which user clock is independent of the radio clock, that each network node is arranged to determine, in response to events specified by a central network node, a time value related to the relevant user clock, that the central network node is arranged at least to transmit a last time value formed by a selected network node, and that each network node is arranged to form the difference between the last two time values determined and to realize frequency synchronization of its user clock supply in dependence on the comparison of the difference between its last two time values determined with the difference between last two time values of the selected network node, wherein
in order to correct its absolute time, a network node is arranged to adjust its user time counter delivering its time values to the value $TC_{new}=TC_{old}+R2'(N_r)-R2'(N_i)$ where $TC_{old}$ is the current value of the user time counter prior to the correction, $TC_{new}$ is the corrected value of the user time counter, $R2'(N_r)$ is the last transmitted time value of the selected network node which has been changed by a network node-specific correction value, and $R2'(N_i)$ is the time value of a network node i (i≠r) which has been changed by a network node-specific correction value, and
that the relevant network node-specific correction value takes into account the processing-imposed delay between the instant of reading out of the user time counter and the maximum value of the radio synchronization pulse formed from the radio synchronization signal in the relevant network node.

12. A wireless network as claimed in claim 5, wherein
in order to correct its absolute time, a hidden network node is arranged to adjust its user time counter delivering its time values to the value $$TC_{new}=TC_{old}+R2'(N_r)-R2'(N_i)$$

where $TC_{old}$ is the current value of the user time counter prior to the correction, $TC_{new}$ is the corrected value of the user time counter, $R2'(N_r)$ is the last time value of the frequency synchronized intermediate network node which has been changed by a network node-specific correction value, and $R2'(N_i)$ is the time value of a hidden network node i (i≠r) which has been changed by a network node-specific correction value, and that the relevant network node-specific correction value takes into account the processing-imposed delay between the instant of reading out of the user time counter and the maximum value of the radio synchronization pulse formed from the radio synchronization signal in the relevant network node.

13. A wireless network as claimed in claim 8, wherein
in order to correct its absolute time, a network node of a second sub-network is arranged to adjust its user time counter delivering its time values to the value $$TC_{new}=TC_{old}+R2'(N_r)-R2'(N_i)$$

where $TC_{old}$ is the current value of the user time counter prior to the correction, $TC_{new}$ is the corrected value of the user time counter, $R2'(N_r)$ is the last transmitted time value of the frequency synchronized bridge network node which has been changed by a network node-specific correction value, and $R2'(N_i)$ is the time value of a network node i (i≠r) of the second sub-network which has been changed by a network node-specific correction value, and that the relevant network node-specific correction value takes into account the processing-imposed delay between the instant of reading out of the user time counter and the maximum value of the radio synchronization pulse formed from the radio synchronization signal in the relevant network node.

* * * * *